United States Patent
Muramatsu et al.

(10) Patent No.: US 7,551,831 B2
(45) Date of Patent: Jun. 23, 2009

(54) INFORMATION RECORDING MEDIUM AND INFORMATION RECORDER

(75) Inventors: Eiji Muramatsu, Tokorozawa (JP); Shoji Taniguchi, Tokorozawa (JP)

(73) Assignee: Pioneer Corporation, Meguro-ku, Tokyo (JP)

( * ) Notice: Subject to any disclaimer, the term of this patent is extended or adjusted under 35 U.S.C. 154(b) by 466 days.

(21) Appl. No.: 10/520,665

(22) PCT Filed: May 30, 2003

(86) PCT No.: PCT/JP03/06853

§ 371 (c)(1), (2), (4) Date: Jan. 10, 2005

(87) PCT Pub. No.: WO2004/008442

PCT Pub. Date: Jan. 22, 2004

(65) Prior Publication Data

US 2005/0254795 A1 Nov. 17, 2005

(30) Foreign Application Priority Data

Jul. 10, 2002 (JP) ............................. 2002-201620

(51) Int. Cl.
*H04N 9/79* (2006.01)
*H04N 5/00* (2006.01)

(52) U.S. Cl. ........................................ 386/45; 386/125
(58) Field of Classification Search ...................... 386/1, 386/45, 125–126
See application file for complete search history.

(56) References Cited

U.S. PATENT DOCUMENTS 7,287,167 B2 * 10/2007 Sako et al. .................. 713/193

FOREIGN PATENT DOCUMENTS

| CN | 1199490 | 11/1998 |
| JP | A-02-185737 | 7/1990 |

(Continued)

OTHER PUBLICATIONS

Inoue et al., "Phase Change Disc for High Data Rate Recording," Mar. 2001, *Japanese Journal of Applied Physics, Physical Society of Japan*, vol. 40, No. Part 1, N3B, p. 1641-1642.

Nichimura et al., "Optical Disk Recording Using a GaN Blue-Violet Laser Diode," Feb. 2000, *Japanese Journal of Applied Physics, Japan Society of Applied Physics*, vol. 39, No. 2b, p. 937-942.

(Continued)

*Primary Examiner*—Thai Tran
*Assistant Examiner*—Nigar Chowdhury
(74) *Attorney, Agent, or Firm*—Drinker Biddle & Reath LLP

(57) ABSTRACT

An object of the invention is to provide an optical disc in which the influence of recording interference is reduced to make it possible to narrow the interval between adjacent recording tracks and increase the recording density of information. The optical disc comprises a substrate on which the grooves are formed, a reflecting layer for reflecting an optical beam, a recording layer, and a cover layer for protecting the recording layer, in which the cover layer, the recording layer, the reflecting layer and the substrate are disposed in this order from the side where the optical beam is applied, and the thickness of the recording layer formed in an area opposed to the groove and forming a recording track is greater than the thickness of the recording layer formed in an area opposed to an area on the substrate between two adjacent grooves.

4 Claims, 5 Drawing Sheets

FOREIGN PATENT DOCUMENTS

| | | |
|---|---|---|
| JP | A-06-282871 | 10/1994 |
| JP | 10-340483 | 12/1998 |
| JP | A-2002-008269 | 1/2002 |
| JP | 2003-109246 | 4/2003 |
| JP | 2003-263779 | 9/2003 |

OTHER PUBLICATIONS

Nishiwaki et al., "Organic Dye 25 GB Write-Once Disk with In-Groove Structure," 2006, *Japanese Journal of Applied Physics, Japan Society of Applied Physics,* vol. 45, No. 2B, p. 1452-1455.

* cited by examiner

FIG. 5
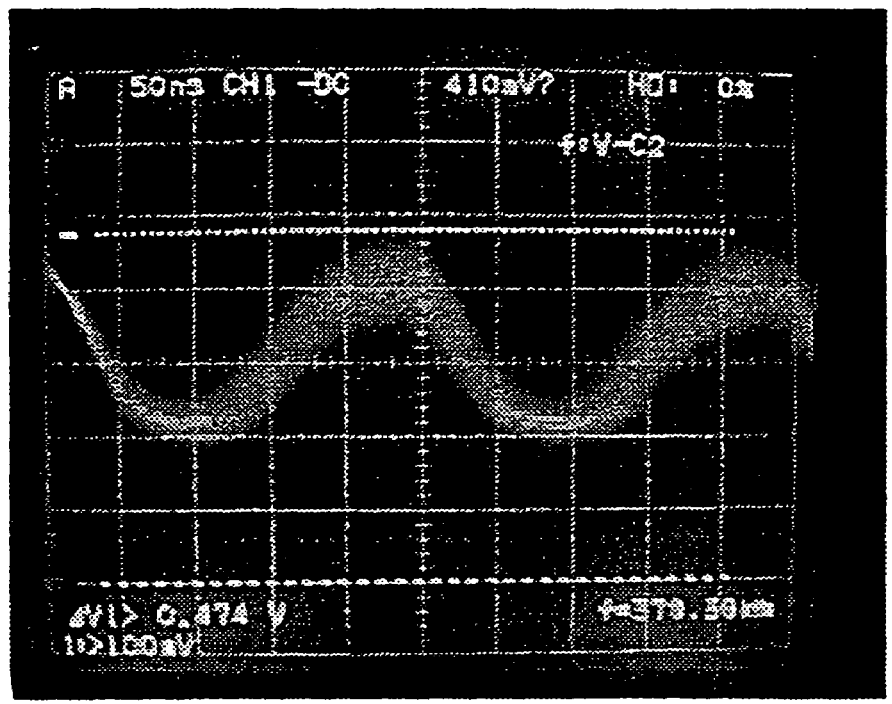
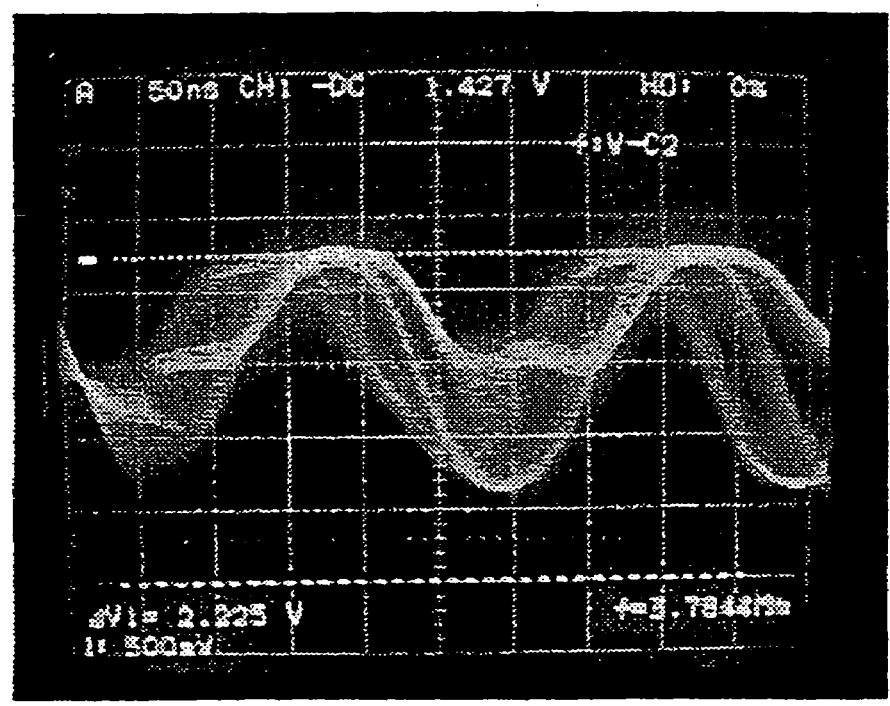

INFORMATION RECORDING MEDIUM AND INFORMATION RECORDER

TECHNICAL FIELD

The present invention relates to a technical field of an information recording medium and an information recording apparatus, and more particularly to a technical field of an information recording medium on or from which the information is optically recorded or reproduced and an information recording apparatus for optically recording the information on the information recording medium.

BACKGROUND ART

In recent years, a DVD (Digital Versatile Disc) has widely generalized as a disc-like information recording medium capable of recording the information at high density.

Here, the conventional recordable DVD (e.g., DVD-R (DVD-Recordable)), in which an optical beam for information recording is applied on the DVD from the side of a substrate, had typically such a cross-sectional structure that the substrate, a recording layer on or from which the information is recorded or reproduced, a reflecting layer for reflecting the applied optical beam, and a cover layer for protecting the reflecting layer and the recording layer are laminated in this order from the side where the optical beam is applied.

As the recording tracks on which the information is recorded, the grooves formed on the substrate are convex as seen from the incident side of the optical beam (accordingly concave as seen from the substrate itself). Each recording track is composed of the recording layer and the reflecting layer formed on each groove. Since the recording layer itself is usually formed by a spin coat method, the recording layer formed in an area opposed to the groove has a greater thickness than the recording layer formed in an area opposed to the area of DVD other than the groove (e.g., area between two adjacent grooves, which is typically referred to as a land). This is due to the fact that when the recording layer is formed by the spin coat method on the substrate on which the groove and the land are alternately formed, a lot of liquid material serving as the recording layer is gathered within the groove.

In recent years, some researches on providing the DVD with high recording density (the DVD having high recording density is hereinafter referred to as a high density DVD) have been carried out, in which one research involves an attempt for attaining the high recording density by shortening the wavelength of the recording or reproducing optical beam to make a recording pit smaller. In the high density DVD, unlike the conventional DVD, the optical beam for information recording is incident on the high density DVD from the side of the cover layer.

Here, if the conventional DVD having such a cross-sectional structure that the recording track is formed on a convex portion as seen from the incident side of optical beam, and the optical beam is applied on the recording track is directly employed for the high density DVD, the recording layer serving as the recording track is formed at the position opposed to the land on the substrate, so that the shape of the recording track may be convex on the side of the cover layer that is the incident side of optical beam in the cross-sectional structure.

Supposing that the recording layer is formed by the same spin coat method of the conventional DVD, employing this substrate, the groove itself of the substrate can not be formed deeply, if a desired thickness of the recording layer tries to be attained by gathering a lot of liquid material serving as the recording layer at the position opposed to the land. As a result, a lot of liquid material is also gathered in the groove other than the land, whereby the thickness of the recording layer formed as the recording track in the area opposed to the land is equal to or less than the thickness of the recording layer formed in the area opposed to the groove.

However, if a recording optical beam having a shorter wavelength is directed to the high density DVD formed in this way, not only the recording layer in the area opposed to the land but also the (thicker) recording layer in the area opposed to the groove are provided with the characteristics as the recording pits due to irradiation, resulting in a problem that a recording interference phenomenon occurs that the pseudo recording pits are formed in the area other than the recording track on the land.

Due to this problem, when the recorded information is reproduced, the information from the recording pits other than the recording pits for carrying the information to be essentially reproduced is intermingled into the reflected light of the optical beam for information reproduction, aggravating the C/N ratio (ratio of carrier wave level to noise level) at the time of reproduction, and leading to another problem that the correct information reproduction is not performed.

DISCLOSURE OF INVENTION

Thus, this invention has been achieved in the light of the above-mentioned problems, and it is an object of the invention to provide an information recording medium in which the influence of recording interference is reduced to make it possible to narrow the interval between adjacent recording tracks and increase the recording density of information, and an information recording apparatus for optically recording the information on the information recording medium.

In order to achieve the above object, a first invention provides an information recording medium comprising a substrate on which the grooves are formed, a recording layer to which an optical beam is applied; and a cover layer for protecting the recording layer, wherein the thickness of said cover layer is thinner than the thickness of said substrate; wherein the cover layer, the recording layer and the substrate are disposed in this order from the side where the optical beam is applied, and wherein the thickness of the recording layer formed in an area opposed to the groove and forming a recording track on which the information is recorded is greater than the thickness of the recording layer formed in an area opposed to an area on the substrate between the two adjacent grooves.

According to the first invention, the cover layer, the recording layer and the substrate are disposed in this order from the side where the optical beam is applied, in which the thickness of the recording layer formed in an area opposed to the groove and forming a recording track on which the information is recorded is greater than the thickness of the recording layer formed in an area opposed to an area on the substrate between the two adjacent grooves, whereby a recording interference, which may occur between adjacent recording tracks when a part of the optical beam is applied on the area other than the recording track, has less influence on the information reproduction, making it possible to narrow the interval between adjacent recording tracks and increase the recording density of information in the information recording medium.

In a preferred first embodiment of the first invention, a reflecting layer for reflecting the optical beam is disposed between the recording layer and the substrate, and the recording layer is formed on the reflecting layer provided on the substrate by a spin coat method.

According to the first embodiment, the reflecting layer for reflecting the optical beam is disposed between the recording layer and the substrate, whereby the optical beam is reflected securely, and the recording layer is formed by the spin coat method, whereby the recording interference has less influence in the information recording medium formed with the recording layer by the spin coat method, making it possible to narrow the interval between adjacent recording tracks and increase the recording density of information.

In a preferred second embodiment of the first invention, the depth of the groove and the thickness of the recording layer forming the recording track are set up such that $-360° < \theta_0, \theta_1 < -180°, \text{ and } \theta_0 < \theta_1$ where the phase in the reflected light of the optical beam from the recording track on which the information is not recorded is $\theta_0$, the phase in the reflected light of the optical beam from the recording track on which the information is recorded is $\theta_1$, and the phase in the reflected light of the optical beam from an area on the substrate between the two adjacent grooves in the information recording medium on which the information is not recorded is 0°.

According to the second embodiment, the depth of the groove on the substrate and the thickness of the recording layer forming the recording track are set up such that $-360° < \theta_0, \theta_1 < -180°, \text{ and } \theta_0 < \theta_1$, whereby the recording interference, which may occur between adjacent recording tracks when a part of the optical beam is applied on the area other than the recording track, has less influence on the information reproduction.

Also, in order to achieve the above object, a second invention provides an information recording apparatus for recording the information on the information recording medium according to the first invention, comprising an encoder device for encoding the information to generate the encoded information, a modulation device for modulating the optical beam based on the generated encoded information, and a radiation device for radiating the modulated optical beam to the recording track from the side of the cover layer to record the information.

According to the second invention, there are provided an encoder device for encoding the information such as music information Sain to be recorded to generate the recording information Se, a modulation device for modulating the optical beam B based on the recording information Se, and a radiation device for radiating the modulated optical beam B to the recording track TR to record the information, whereby the recording interference occurring between adjacent recording tracks has less influence on recording the information, making it possible to narrow the interval between adjacent recording tracks TR and increase the recording density of information to record the information.

BRIEF DESCRIPTION OF DRAWINGS

FIG. 5 shows two examples, in which FIG. 5A is a view showing the effects of the embodiment, and FIG. 5B is a view showing the effects of the conventional example.

BEST MODE FOR CARRYING OUT THE INVENTION

The preferred embodiments of the present invention will be described below with reference to the accompanying drawings.

In the following embodiments, the information is recorded on an optical disc DK as an information recording medium or high density DVD.

(I) Embodiment of Information Recording Medium

Figure 1:
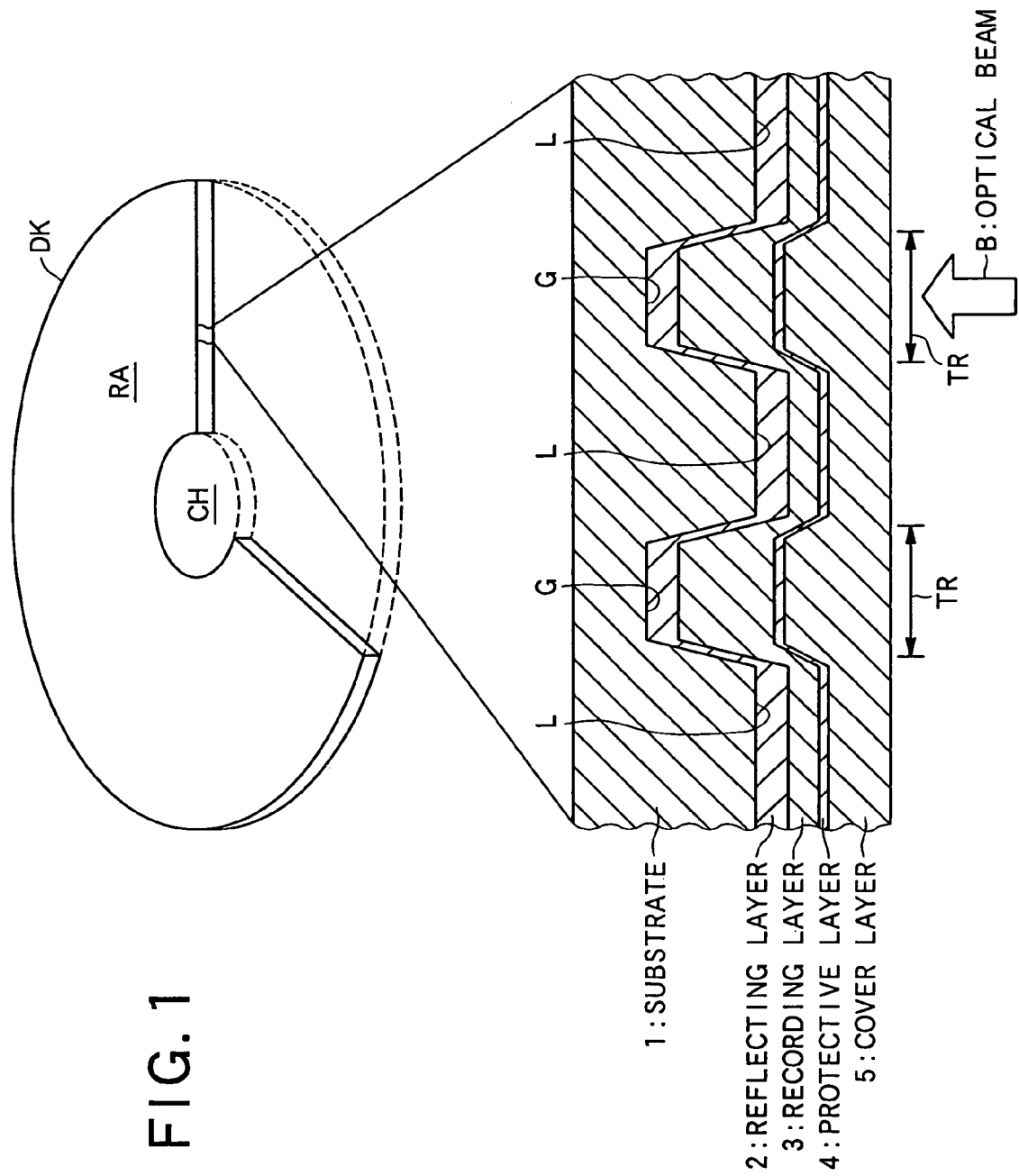
FIG. 1 is a view showing the structure of an optical disc according to an embodiment of the present invention.
Figure 2:
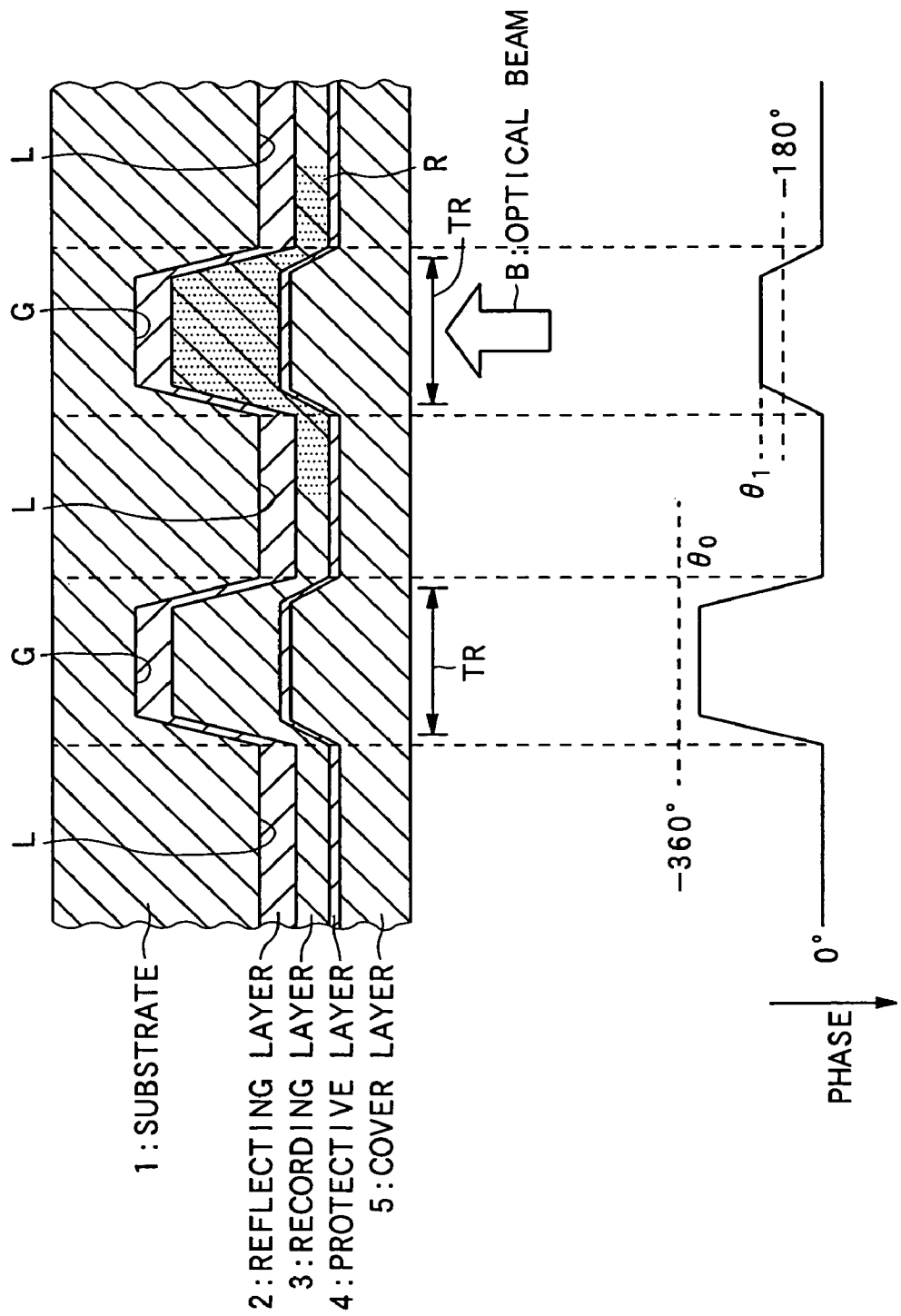
FIG. 2 is a view (I) for explaining the recording on the optical disc according to the embodiment.
Figure 3:
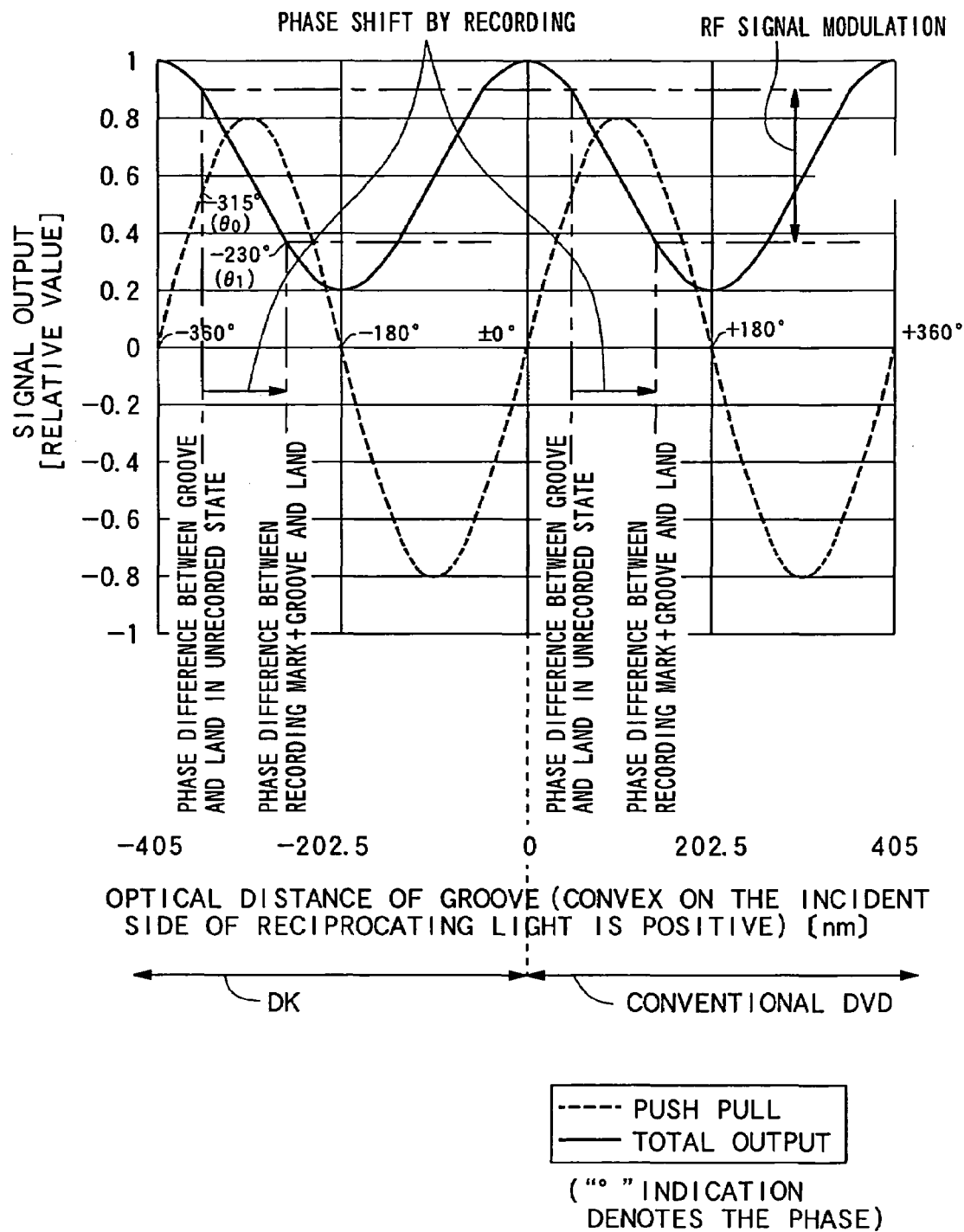
FIG. 3 is a view (II) for explaining the recording on the optical disc according to the embodiment.

Referring to FIGS. 1 to 3, the structure of an optical disc according to this embodiment will be firstly described below. Here, FIG. 1 is an appearance perspective view of the optical disc and a cross-sectional view of the optical disc partially taken radially. FIGS. 2 and 3 are views for explaining the scheme of recording on the optical disc.

As shown in FIG. 1, the optical disc DK of this embodiment is composed of a center hole CH for use in mounting the optical disc DK in a rotational axis of a spindle motor on an information recording apparatus and a recording portion RA on which various pieces of information are recorded.

The recording portion RA at least comprises, from its inner circumferential side, Lead-in area for recording the information to be firstly read in starting the reproduction of the information recorded on the optical disc DK, for example, the information for setting up the intensity of optical beam for information reproduction or the information concerning the start address of a data area and so on, the data area for recording the information to be actually reproduced, and a read-out area for recording the information to be read in ending the reproduction of the information within the data area, for example, the information concerning the end address of the data area and so on.

Also, the recording portion RA has the recording tracks (described later), on which the information is recorded, spirally formed from the inner to outer circumference of the optical disc DK.

The cross-sectional structure of the optical disc DK will be described below.

As shown in FIG. 1 below, the optical disc DK of this embodiment comprises a substrate 1, a reflecting layer 2, a recording layer 3, a protective layer 4, and a cover layer 5.

In this constitution, the substrate 1 as a base substance of the optical disc DK has a spiral groove G that is formed as a concave portion as seen from the substrate 1 itself, and a land L that is formed as a convex portion as seen from the substrate 1 itself in an area between the grooves G, as shown in FIG. 1.

The reflecting layer 2 is laminated along the surface shape of the substrate lover the entire substrate 1 comprising the grooves G and the lands L. Here, the reflecting layer 2 has a function of reflecting the optical beam B for information recording that is incident from the side of the cover layer 5 (described later) of the optical disc DK and the optical beam for information reproduction, not shown, (which has a different intensity from the optical beam B, the optical beam for information reproduction being hereinafter referred to as the optical beam P). The reflecting layer 2 may be omitted by making use of the reflection of a boundary face between the substrate 1 and the recording layer 3.

On the reflecting layer 2, the recording layer 3 for carrying the information recorded on the optical disc DK is laminated along the surface shape of the reflecting layer 2. Here, the recording layer 3 is made of a material of which the reflectance to the optical beam P is lower due to a rise in temperature caused by irradiation with the optical beam B. Specifically, this material may be cyanine organic dye.

On the recording layer 3, the protective layer 4 for protecting the recording layer 3 from the water content in the air or outside temperature variations is laminated along the surface shape of the recording layer 3.

And on the protective layer 4, the cover layer 5 for further protecting the reflecting layer 2, the recording layer 3 and the protective layer 4 is laminated about 0.1 mm thick. The cover layer 5 and the protective layer 4 are made of a material transparent to the optical beam B and the optical beam P for irradiation. Bonding a thin film sheet onto the protective layer 4 may form the cover layer 5. In the above structure, the recording tracks TR as shown in FIG. 1 are spirally formed in the recording portion RA.

In the optical disc DK of this embodiment, at least the recording layer 3 is formed by a spin coat method after a liquid material serving as the recording layer 3 is coated on the substrate 1 formed with the grooves G, whereby more liquid material is gathered in the grooves G of the substrate 1, so that the thickness of the recording layer 3 (i.e., the recording layer 3 making up the recording track TR) formed in an area opposed to the groove G is greater than the thickness of the recording layer 3 formed in an area opposed to the l and L.

When the information is recorded by the optical beam B on the recording layer 3 in the recording track TR within the optical disc DK having the above structure, the optical beam B is applied onto the recording track TR of object, as shown in FIG. 2. And by irradiation with the optical beam B, the recording layer 3 forming the recording track TR is changed in the characteristic, so that the reflectance to the optical beam P becomes lower.

Here, the optical beam B is applied on the optical disc DK in a range of the optical disc DK where the recording track TR is formed, as well as the portions near the recording track TR in the areas opposed to two adjacent lands L on the inner and outer circumferential sides of the recording track TR of irradiation object, when the center of optical beam B is located on the center line of the recording track TR. Accordingly, after the optical beam B is applied, the recorded area R having lower reflectance is formed in the recording track TR itself of irradiation object and the portions near the recording track TR in two adjacent areas across the recording track TR. At this time, the reason why the optical beam B is also applied in the range including the portions near the recording track TR in two adjacent areas on the inner and outer circumferential sides of the recording track TR of irradiation object is that a tracking servo control is performed during the information recording.

Referring to FIGS. 2 and 3, when reproducing the information from the optical disc DK, the relationship between a change in the phase of the optical beam P occurring when the optical beam P is applied in the recorded area R of the optical disc DK, and a change in the phase of the optical beam P occurring when the optical beam P is applied in the portions other than the recorded area R (i.e., information unrecorded portions) will be described below.

When the information recorded on the recording track TR is reproduced employing the optical beam P, owing to a change in the phase caused by a difference in the optical path length between the optical beam P applied in the recording track TR and the optical beam P applied in the areas other than the recording track TR, in addition to a lower reflectance caused by irradiation with the optical beam B, the light quantity of reflected light of the optical beam P from the recorded area R on the recording track TR is considerably lower than the light quantity of reflected light of the optical beam P from the area other than the recorded area R on the recording track TR and the area other than the recording track TR, thereby making the reproduction of information possible.

At this time, the change in the phase depends on the depth of groove G and the thickness of the recording layer 3 forming the recording track TR. More specifically, in the optical disc DK of this embodiment, the depth of groove G and the thickness of the recording layer 3 forming the recording track TR are set up such that $$-360° < \theta_0, \theta_1 < -180°, \text{ and } \theta_0 < \theta_1$$

where the phase of reflected light of the optical beam P from the recording track TR other than the recorded area R is $\theta_0$, the phase of reflected light of the optical beam P from the recording track TR corresponding to the recorded area R is $\theta_1$, and the phase of reflected light of the optical beam P from the area on the optical disc DK other than the recorded area R and the recording track TR is 0°, as shown in FIG. 2 below.

Referring to FIG. 3, a change in the phase as shown in FIG. 2 will be more specifically described below. FIG. 3 is a view showing the depth (height) of groove and the change in the corresponding phase for a total output signal of the photodetector used for information reproduction (indicated by the solid line in FIG. 3) and a push pull signal used for the tracking servo control (indicated by the broken line in FIG. 3), in a case where the conventional DVD is directly employed for the information recording by the optical beam incident from the side of the cover layer (i.e., the recording track convex as seen from the side of the cover layer is formed, in the right half part of FIG. 3), and a case where the optical disc DK of this embodiment is employed for the information recording (i.e., the recording track TR concave as seen from the side of the cover layer 5 is formed, in the left half part of FIG. 3).

The example of FIG. 3 reveals the structure of the optical disc DK, in which the material of the recording layer 3 is cyanine organic dye, the depth of groove G being 100 nm, the thickness of the recording layer 3 forming the recording track TR being 100 nm, the thickness of the recording layer 3 formed in the areas opposed to the land L being 40 nm, the width of the recording track TR being 0.16 μm, and the distance between adjacent recording tracks TR (tracking pitch) being 0.32 μm.

As shown in the right half part of FIG. 3, when the conventional DVD is directly employed for the information recording by the optical beam incident from the side of the cover layer, the phase in the reflected light of the optical beam for information reproduction is positive before and after the recording process, and changed as shown in the right half part of FIG. 3, because the recording layer in the conventional DVD is convex as seen from the incident side of the optical beam.

On the other hand, when the optical disc DK of this embodiment is employed for the information recording by the optical beam incident from the side of the cover layer, the phase in the reflected light of the optical beam P is negative before and after the recording process, and changed from −315° (unrecorded portion) to −230° (recorded area R), for example, as shown in the left half part of FIG. 3, because the recording layer 3 is concave as seen from the incident side of the optical beam P (see FIG. 1). And this change of phase corresponds to a degree of modulation for the RF (Radio Frequency) signal when reproducing the information.

(II) Embodiment of Information Recording Apparatus

Figure 4:
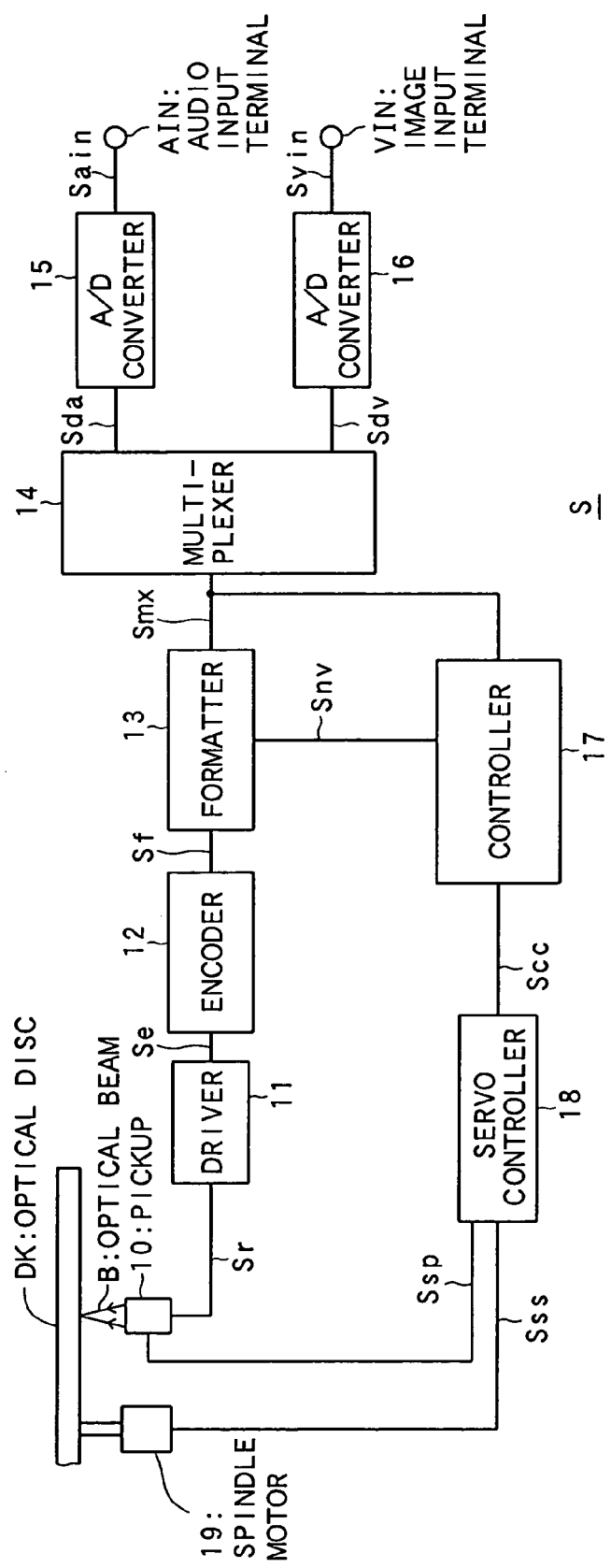
FIG. 4 is a block diagram showing the schematic configuration of an information recording apparatus according to the embodiment.

Referring to FIG. 4, an embodiment of the information recording apparatus for recording the image information and music information on the optical disc DK having the above structure will be described below.

As shown in FIG. 4, the information recording apparatus S of the embodiment comprises a pickup 10 as a radiating device, a driver 11 as a modulating device, an encoder 12 as an encoding device, a formatter 13, a multiplexer 14, the A/D converters 15 and 16, a controller 17, and a servo controller 18.

The operation will be now described.

First of all, the music information Sain input via a audio input terminal AIN from the outside is input into an A/D converter 15, digitized in the A/D converter 15, and output as the digital music information Sda to the multiplexer 14.

On the other hand, the image information Svin input via an image input terminal VIN from the outside is input into an A/D converter 16, digitized in the A/D converter 16, and output as the digital image information Sdv to the multiplexer 14.

And the multiplexer 14 synthesizes the digital music information Sda and the digital image information Sdv into the synthesis information Smx, which is then output to the formatter 13 and the controller 17.

Thereby, the controller 17 generates the control information (generally referred to as the navigation information) for controlling the way of reproduction in reproducing the above-cited information from the optical disc DK, based on the synthesis information Smx, and outputs the control information Snv to the formatter 13.

The formatter 13 superimposes the control information Snv on the music information and image information input as the synthesis information Smx in accordance with a standardized format, and outputs the superimposed information Sf to the encoder 12.

Then, the encoder 12 encodes the superimposed information Sf, in which a recording signal Se for recording the superimposed information Sf on the optical disc DK is generated by modulating the intensity of optical beam B emitted from the pickup 10 based on the encoded superimposed signal Sf and output to the driver 11.

And the driver 11 generates a drive signal Sr for driving a semiconductor laser, not shown, within the pickup 10, based on the recording signal Se, and outputs the drive signal Sr to the semiconductor laser.

Thereafter, the semiconductor laser modulates the intensity of optical beam B in accordance with the content of the drive signal Sr, and emits the optical beam B to the recording track TR of object on the optical disc DK. And when the optical beam B is modulated in intensity and applied in the recording track TR, the recorded area R (recording pit) of which the reflectance is changed corresponding to the content of the drive signal Sr within the recording track TR is formed, whereby the music information Sain and the image information Svin are recorded on the optical disc DK.

At this time, of the vertical and horizontal positions of the optical beam B that is applied in the recording track TR, the vertical position of optical beam B applied (i.e., converged position of optical beam B) is controlled by driving a focus actuator, not shown, within the pickup 10, based on a control signal Ssp from the servo controller 18, while the horizontal position of optical beam B applied is controlled by driving a tracking actuator, not shown, within the pickup 10.

Moreover, the spindle motor 19 controls the rotation of the optical disc DK so that the preset rotation number may be reached, based on a control signal Sss from the servo controller 18.

For them, the servo controller 18 generates and outputs the control signals Sss and Ssp, based on a control signal Scc from the controller 17.

As described above, with the optical disc DK of the embodiment and the corresponding information recording apparatus S, the recording track TR is formed concave on the substrate 1 as seen from the side of the cover layer 5 on which the optical beam B is incident, so that the thickness of the recording layer 3 forming the recording track TR is greater than the thickness of the recording layer 3 formed in the area opposed to the land L. Therefore, the recording interference, which may occur between adjacent recording tracks TR when a part of the optical beam P is applied on the area other than the recording track TR, has less influence on the information reproduction, making it possible to narrow the interval between adjacent recording tracks TR and increase the recording density of information in the optical disc DK.

Also, since the recording layer 3 is formed, employing the spin coat method, there is less influence of recording interference on the optical disc DK having the recording layer 3 formed by the spin coat method, thereby narrowing the interval between adjacent recording tracks TR and increasing the recording density of information.

Moreover, supposing the above conditions, the depth of groove G in the substrate 1 and the thickness of the recording layer 3 forming the recording track TR are set up such that $$-360° < \theta_0, \theta_1 < -180°, \text{ and } \theta_0 < \theta_1$$

whereby the influence of recording interference between adjacent recording tracks TR caused by applying a part of the optical beam P in the area other than the recording track TR on the information reproduction is further reduced.

Moreover, the music information Sain to be recorded is encoded to generate the recording information Se, the optical beam B is modulated based on the recording information Se, and the modulated optical beam B is applied in the recording track TR to record the information, whereby there is less influence of recording interference between adjacent recording tracks TR in recording the information, thereby narrowing the interval between adjacent recording tracks TR and increasing the recording density of information to record the information.

(III) Examples

Referring to FIG. 5, the effects of using the optical disc DK and the information recording apparatus S according to this embodiment will be specifically described below. FIG. 5 shows the experimental results concerning the influence of recording pits on adjacent recording tracks on the reproducing signal when the conventional DVD is directly employed for recording the information by the optical beam incident from the side of the cover layer (FIG. 5B), and the influence of recording pits (recorded area R) on adjacent recording tracks TR on the reproducing signal when the optical disc DK of this embodiment is employed for recording the information by the optical beam B incident from the side of the cover layer 5 (FIG. 5A).

The experimental items for the experimental results as shown in FIG. 5 are as follows. For the optical disc DK, the material of the recording layer 3 is cyanine organic dye, the depth of groove G is 100 nm, the thickness of the recording layer 3 forming the recording track TR is 100 nm, the thickness of the recording layer 3 in the area opposed to the land L is 40 nm, the reflectance of the overall optical disc DK is 37.6%, the width of recording track TR is 0.16 μm, the distance (track pitch) between adjacent recording tracks TR is 0.32 μm, the reflectance of the substrate 1 is 1.63+0.0i, the reflectance of the reflecting layer 2 is 0.30+3.62i, the reflectance of the recording layer 3 is 1.99+0.05i, the reflectance of the protective layer 4 is 2.31+0.00i, and the reflectance of the cover layer 5 is 1.63+0.00i, in which the modulation ratio is 0.805.

As will be apparent from FIGS. 5A and 5B, the thickness of the recording layer is almost equivalent between the position opposed to the recording track and the position opposed to the land in the case of FIG. 5B, whereby the recording pits on the adjacent recording tracks have great influence on the reproducing signal. That is, the recorded area formed in the recording tracks adjacent to the recording track of reproduction object and the area between recording tracks (area opposed to the land) has great influence on the reproducing signal obtained from the recording track, so that more noise may be contained in the reproducing signal. In the case of the embodiment as shown in FIG. 5A, since the thickness of the recording layer 3 forming the recording track TR is greater than the thickness of the recording layer 3 formed at the position opposed to the land L, there is less influence of the recording pits on the adjacent recording tracks TR on the reproducing signal, so that the reproducing signal hardly contains the noise.

From the experimental results as shown in FIG. 5, it is confirmed that there is the effect of reducing the recording interference on the optical disc DK of this embodiment and the information recording apparatus S.

The invention claimed is:

1. An information recording medium comprising:
a substrate on which the grooves are formed;
a recording layer to which an optical beam is applied; and
a cover layer for protecting said recording layer,
wherein the thickness of said cover layer is thinner than the thickness of said substrate;
wherein said cover layer, said recording layer and said substrate are disposed in this order from the side where said optical beam is applied; and
wherein the thickness of said recording layer formed in an area opposed to said groove and forming a recording track on which the information is recorded is greater than the thickness of said recording layer formed in an area opposed to an area between said two adjacent grooves on said substrate.

2. The information recording medium according to claim 1, wherein a reflecting layer for reflecting said optical beam is disposed between said recording layer and said substrate, and said recording layer is formed on said reflecting layer provided on said substrate by a spin coat method.

3. The information recording medium according to claim 1 or 2, wherein the depth of said groove and the thickness of said recording layer forming said recording track are set up such that $$-360° < \theta 0, \theta 1 < -180°, \text{ and } \theta 0 < \theta 1$$

where the phase in the reflected light of said optical beam from said recording track on which said information is not recorded is θ0, the phase in the reflected light of said optical beam from said recording track on which said information is recorded is θ1, and the phase in the reflected light of said optical beam from an area on said substrate between said two adjacent grooves for said information recording medium on which said information is not recorded is 0°.

4. An information recording apparatus for recording information on the information recording medium, which comprising: a substrate on which the grooves are formed; a recording layer to which an optical beam is applied; and a cover layer for protecting said recording layer, wherein the thickness of said cover layer is thinner than the thickness of said substrate; wherein said cover layer, said recording layer and said substrate are disposed in this order from the side where said optical beam is applied; and wherein the thickness of said recording layer formed in an area opposed to said groove and forming a recording track on which the information is recorded is greater than the thickness of said recording layer formed in an area opposed to an area between said two adjacent grooves on said substrate, comprising:
an encoder device for encoding said information to generate the encoded information;
a modulation device for modulating said optical beam based on said generated encoded information; and
a radiation device for radiating said modulated optical beam to said recording track from the side of said cover layer to record said information.

* * * * *